United States Patent
McLain et al.

(10) Patent No.: US 8,353,201 B2
(45) Date of Patent: Jan. 15, 2013

(54) INTAKE AIR TEMPERATURE RATIONALITY DIAGNOSTIC

(75) Inventors: Kurt D. McLain, Clarkston, MI (US); Wenbo Wang, Novi, MI (US)

(73) Assignee: GM Global Technology Operations LLC

( * ) Notice: Subject to any disclaimer, the term of this patent is extended or adjusted under 35 U.S.C. 154(b) by 1256 days.

(21) Appl. No.: 11/821,591

(22) Filed: Jun. 22, 2007

(65) Prior Publication Data

US 2008/0319600 A1    Dec. 25, 2008

(51) Int. Cl.
*G06F 19/00*    (2006.01)
(52) U.S. Cl. ........... 73/114.31; 123/479; 123/494; 73/114.32; 73/114.34; 701/102; 701/103; 701/107; 701/114; 701/115
(58) Field of Classification Search ........... 701/29, 701/102, 103, 107, 114, 115; 702/185; 123/479, 123/494; 73/114.31, 114.32, 114.34
See application file for complete search history.

(56) References Cited

U.S. PATENT DOCUMENTS

| | | | |
|---|---|---|---|
| 2003/0065483 A1* | 4/2003 | Ting et al. | 702/185 |
| 2003/0182049 A1* | 9/2003 | Bale et al. | 701/108 |
| 2006/0037390 A1* | 2/2006 | Nakano et al. | 73/204.21 |

OTHER PUBLICATIONS

U.S. Appl. No. 11/464,340, filed Aug. 14, 2006, Wenbo Wang et al.
Patent Application by Wenbo Wang et al., "Intake Air Temperature Rationality Diagnostic", filed Jun. 22, 2007, 20 pages.

* cited by examiner

*Primary Examiner* — John Q Nguyen
*Assistant Examiner* — Rodney P King

(57) ABSTRACT

A method of determining whether a fault condition of an intake air temperature (IAT) sensor of an engine is present includes estimating a first manifold absolute pressure (MAP) based on a previously estimated first MAP and an estimated first mass air flow (MAF) as a function of the previously estimated first MAP and estimating a second MAP based on a previously estimated second MAP and a currently measured MAF. An IAT difference is determined based on the first MAP and the second MAP. Whether the fault condition of the IAT sensor is present is determined based on the IAT difference.

21 Claims, 4 Drawing Sheets

INTAKE AIR TEMPERATURE RATIONALITY DIAGNOSTIC

FIELD

The present disclosure relates to internal combustion engines, and more particularly to an intake air temperature sensor rationality diagnostic.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature (IAT), manifold absolute pressure (MAP), throttle position (TPS), engine RPM and barometric pressure ($P_{BARO}$). With specific reference to the throttle, the state parameters (e.g., air temperature and pressure) before the throttle are good references that can be used for engine control and diagnostic. Traditional internal combustion engines include an IAT sensor that directly measures the IAT. In some instances, however, the IAT sensor can become inaccurate as a result of damage, wear and/or a number of other factors. Accordingly, the IAT sensor should be monitored to determine whether the IAT that is determined based on the IAT sensor reading is rational.

Some traditional internal combustion engine systems include a second IAT sensor, the reading from which is compared to that of the first IAT sensor in order to determine whether the first IAT sensor is rational. This additional IAT sensor increases cost and complexity and itself must be monitored for accuracy.

SUMMARY

Accordingly, the present invention provides a method of determining whether a fault condition of an intake air temperature (IAT) sensor of an engine is present. The method includes estimating a first manifold absolute pressure (MAP) based on a previously estimated first MAP and an estimated first mass air flow (MAF) as a function of the previously estimated first MAP and estimating a second MAP based on a previously estimated second MAP and a currently measured MAF. An IAT difference is determined based on the first MAP and the second MAP. Whether the fault condition of the IAT sensor is present is determined based on the IAT difference.

In another feature, the method further includes calculating a MAP difference based on the first MAP and the second MAP, wherein the IAT difference is determined based on the MAP difference.

In another feature, the step of determining whether the fault condition is present includes comparing the IAT difference to a threshold IAT difference and indicating an IAT fault when the IAT difference is greater than the threshold IAT difference.

In another feature, the method further includes estimating the first MAF based on at least one of a throttle inlet pressure, an effective flow area through the throttle, a previously estimated first MAP, measured IAT and a previously estimated MAF.

In another feature, the first MAP is estimated based on an estimated first engine flow rate (EFR) from an intake manifold of the engine.

In still another feature, the second MAP is estimated based on an estimated second engine flow rate (EFR) from an intake manifold of the engine.

In yet another feature, the first and second MAPs are estimated based on respective first and second exhaust gas recirculation (EGR) values.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
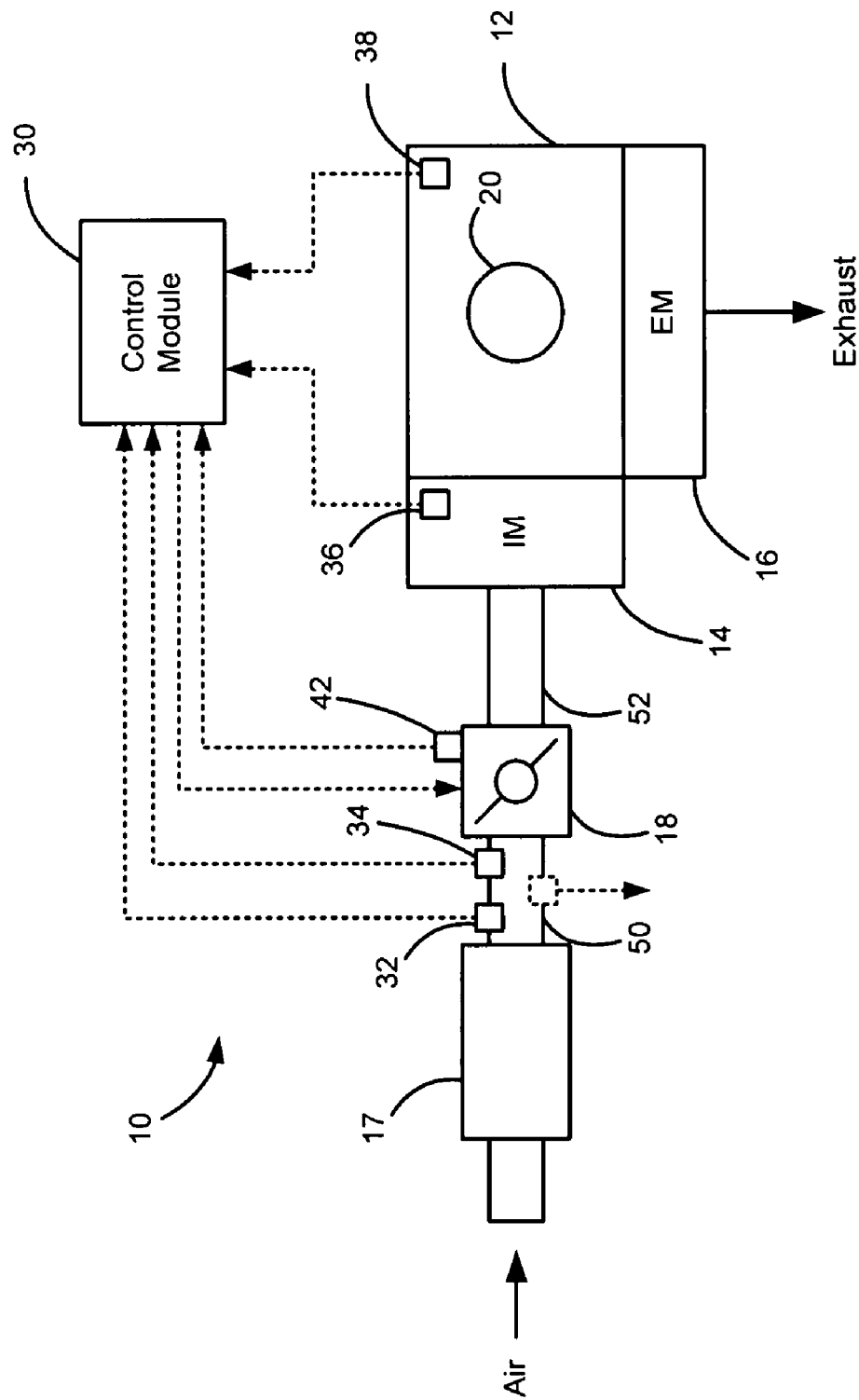
FIG. 1 is a functional block diagram of an internal combustion engine system that is regulated in accordance with the intake air temperature (IAT) rationality control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary internal combustion engine system 10 is illustrated. The engine system 10 includes an engine 12, an intake manifold 14 and an exhaust manifold 16. Air is drawn into the intake manifold 14 through an air filter 17 and a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust after-treatment system (not shown) before being released to atmosphere. Although a single cylinder 20 is illustrated, it is anticipated that the intake air rationality control of the present invention can be implemented with engines having more than one cylinder.

A control module 30 regulates engine operation based on a plurality of engine operating parameters including, but not limited to, a pre-throttle static pressure ($P_{PRE}$), a pre-throttle stagnation pressure ($P_{PRE0}$) (i.e., the air pressures upstream of the throttle), an intake air temperature (IAT), a mass air flow (MAF), a manifold absolute pressure (MAP), an effective throttle area ($A_{EFF}$), an engine RPM and a barometric pressure ($P_{BARO}$). $P_{PRE0}$ and $P_{PRE}$ are determined based on a pre-throttle estimation control, which is disclosed in commonly assigned, co-pending U.S. patent application Ser. No. 11/464,340, filed Aug. 14, 2006.

IAT, MAF, MAP and engine RPM are determined based on signals generated by an IAT sensor 32, a MAF sensor 34, a MAP sensor 36 and an engine RPM sensor 38, respectively, which are all standard sensors of an engine system. $A_{EFF}$ is determined based on a throttle position signal that is generated by a throttle position sensor, which is also a standard sensor. A throttle position sensor 42 generates a throttle position signal (TPS). The relationship between $A_{EFF}$ to TPS is pre-determined using engine dynamometer testing with a temporary stagnation pressure sensor 50 (shown in phantom in FIG. 1) installed. Production vehicles include the relationship pre-programmed therein and therefore do not require the presence of the stagnation pressure sensor.

Figure 2:
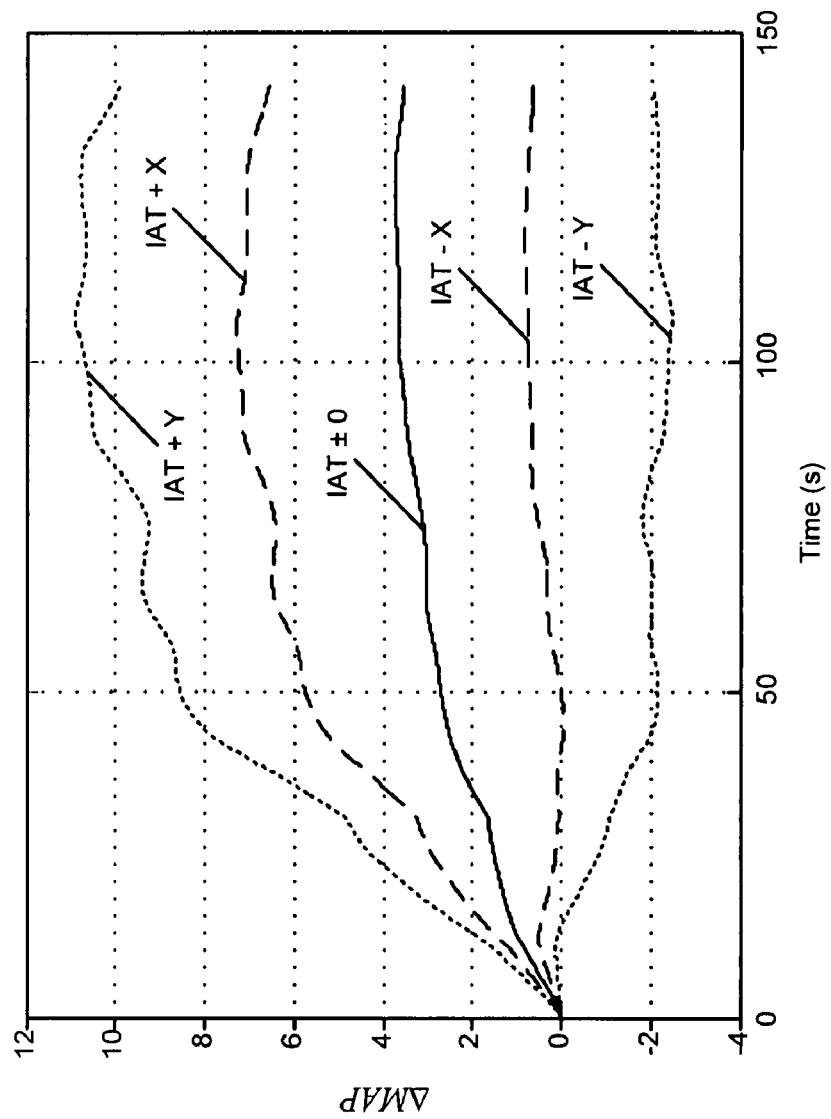
FIG. 2 is a graph illustrating exemplary IAT traces.

The IAT rationality control of the present disclosure monitors the accuracy of the IAT sensor 32. More specifically, a first estimated MAP value (MÂP1) and a second estimated MAP value (MÂP2) are determined and the accuracy of the IAT sensor 32 is monitored based on a difference between MÂP1 and MÂP2 (ΔMÂP). More specifically, ΔMÂP corresponds to a difference between the IAT sensed by the IAT sensor 32 and the actual IAT (ΔIAT) (see FIG. 2). For example, the greater the ΔMÂP in the positive or negative directions, the greater ΔIAT is. As a note, the "^" character indicates an estimated (i.e., not directly measured) value.

MÂP1 is determined based on the following relationship:

$$M\hat{A}P1_t = M\hat{A}P1_{t-1} + \left[\frac{\Delta t \cdot T_m \cdot R \cdot (M\hat{A}F1_t + E\hat{G}R_t - E\hat{F}R1_t)}{V_{INT}}\right] \quad (1)$$

where:
t is the current time step;
t−1 is the previous time step;
Δt is the difference between t and t−1;
Tm is the calculated intake charge temperature as a function of IAT, coolant temperature, vehicle speed and other thermal parameters of flow going into and out the intake manifold system;
R is the gas constant for air (287 m²/(s²·° K);
MÂF1 is the estimated MAF;
EĜR1 is the estimated exhaust gas recirculation into the intake manifold (in the case that an EGR system is present);
EF̂R1 is the gas flow out of the intake manifold (i.e., into the cylinders); and
$V_{INT}$ is the intake manifold volume (constant).
MÂF1, is determined in accordance with the following relationship:

$$M\hat{A}F1_t = \frac{MAF_{LAG} \cdot P_{INLET} \cdot \varphi \cdot A_{EFF}}{\sqrt{R \cdot (IAT_t)}} + (1 - MAF_{LAG}) \cdot M\hat{A}F_{t-1} \quad (2)$$

where:
$P_{INLET}$ is the absolute pressure at the throttle inlet;
$A_{EFF}$ is the effective flow area through the throttle and is determined based on the throttle position (TPS); and $MAF_{LAG}$ is a first order lag filter value that ranges between 0 and 1 with a resolution of 0.1.
φ is determined based on a pressure ratio ($P_R$) across the throttle. $P_R$ is provided as:

$$P_R = \frac{M\hat{A}P1_{t-1}}{P_{INLET}} \quad (3)$$

If $P_R$ is not greater than 0.5283, the flow through the throttle is limited or choked and φ is constant and equal to 0.685. If $P_R$ is greater than 0.5283 and is less than 1, φ is determined based on the following relationship:

$$\varphi = \sqrt{7 \cdot (P_R^{1.428} - P_R^{1.714})} \quad (4)$$

EF̂R1 is determined based on the following relationship:

$$E\hat{F}R1_t = \frac{RPM \cdot M\hat{A}P1_{t-1} \cdot B_{CORR} \cdot N \cdot V_{DISP} \cdot V_{EFF}}{120 \cdot R \cdot T_m} \quad (5)$$

where:
$B_{CORR}$ is a correction factor that is determined based on $P_{BARO}$ and RPM;
$V_{EFF}$ is the volumetric efficiency of the engine and is determined based on RPM and $MAP_{t-1}$;
N is the number of cylinders in the engine; and
$V_{DISP}$ is the engine displacement.
MÂP2 is determined based on the following relationship:

$$M\hat{A}P2_t = M\hat{A}P2_{t-1} + \left[\frac{\Delta t \cdot T_m \cdot R \cdot (M\hat{A}F2_t + E\hat{G}R_t - E\hat{F}R2_t)}{V_{INT}}\right] \quad (6)$$

where MÂF2, is set equal to the currently measured MAF ($MAF_t$). Accordingly, Equation 6 parallels Equation 1 except for the fact that $MAF_t$ is implemented instead of actually estimating MÂF2. Furthermore, EF̂R2 is determined based on the following relationship:

$$E\hat{F}R2_t = \frac{RPM \cdot M\hat{A}P2_{t-1} \cdot B_{CORR} \cdot N \cdot V_{DISP} \cdot V_{EFF}}{120 \cdot R \cdot T_m} \quad (7)$$

Accordingly, Equation 7 parallels Equation 5 above.

Figure 3:
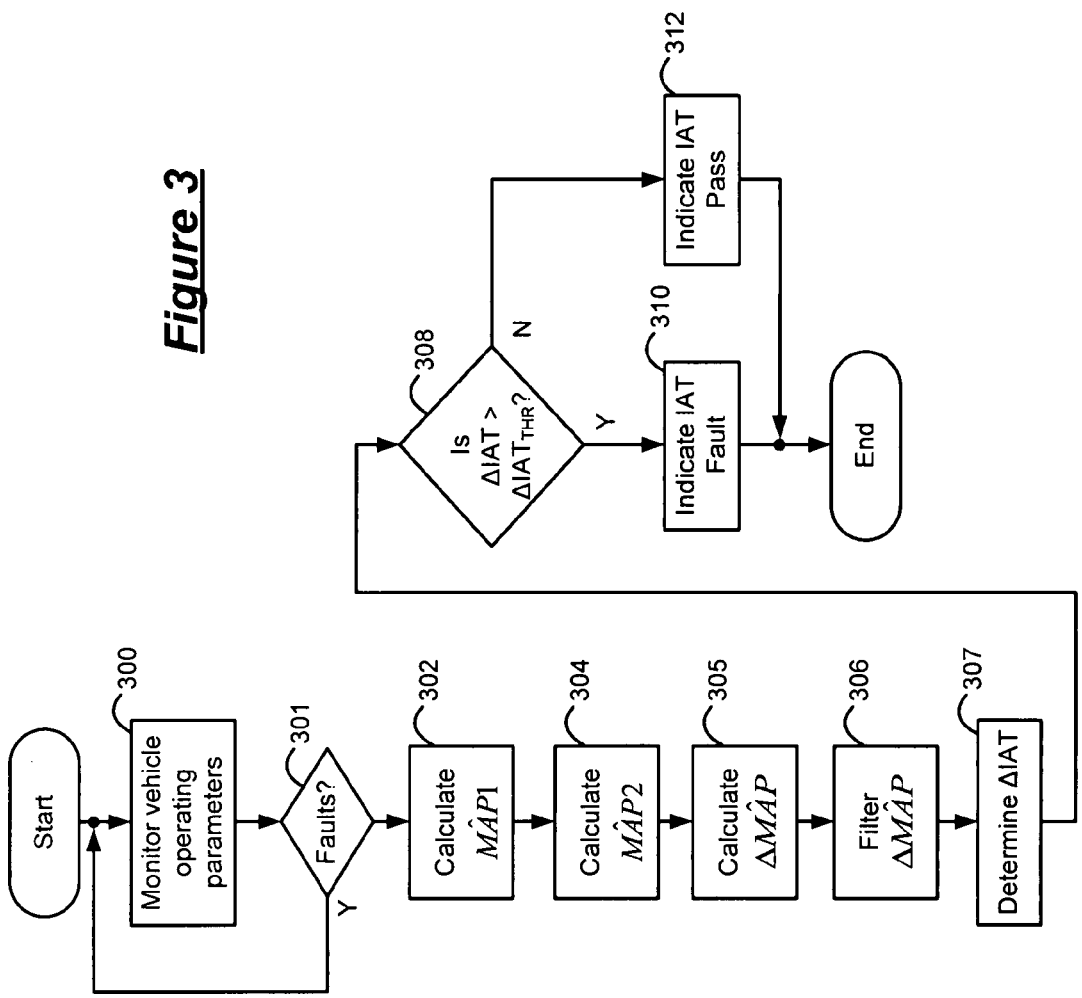
FIG. 3 is a flowchart illustrating exemplary steps that are executed by the IAT rationality control of the present disclosure.

Referring now to FIG. 3, exemplary steps that are executed by the IAT rationality control will be described in detail. In step 300, control monitors the vehicle operating parameters. In step 301, control evaluates whether any applicable active diagnostic faults are detected. The applicable active faults are those that will prevent diagnostic system from making a correct or robust detection. The applicable active faults may include, but are not limited to, MAF sensor fault, TPS fault, and calculated intake charging temperature fault. It is understood that other fault signals may be considered. If any active diagnostic faults are detected, control loops back to step 300. In step 302, control calculates MÂP1 based on the operating parameters. In step 304, control calculates MÂP2 based on the operating parameters. Control calculates ΔMÂP in step 305, and filters ΔMÂP in step 306 using a low pass filter, for example. Control determines ΔIAT in step 307 based on the filtered ΔMÂP. In step 308, control determines whether ΔIAT is greater than $\Delta IAT_{THR}$. If ΔIAT is greater than $\Delta IAT_{THR}$, control continues in step 310. If ΔIAT is not greater than $\Delta IAT_{THR}$, control continues in step 312. In step 310, control indicates a fault with the IAT sensor. In step 312, control indicates a pass with the IAT sensor and control ends.

Figure 4:
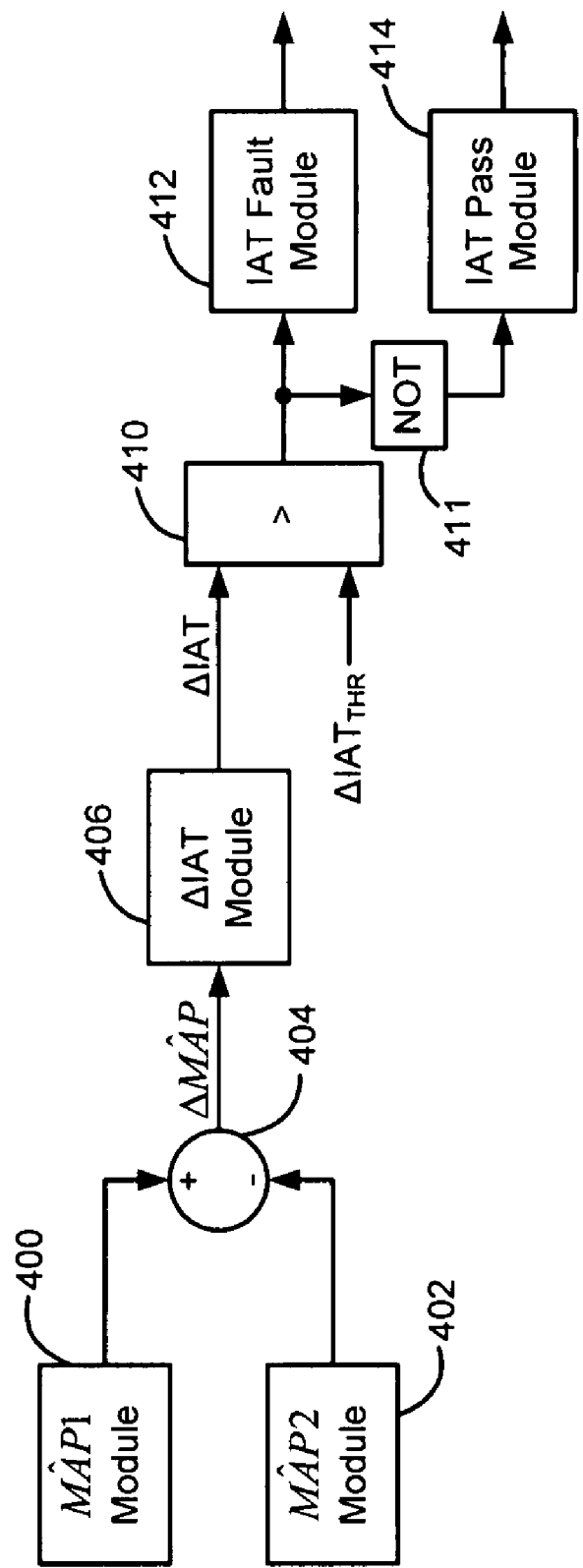
FIG. 4 is a functional block diagram illustrating exemplary modules that execute the IAT rationality control.

Referring now to FIG. 4, exemplary modules that execute the IAT control will be described in detail. The exemplary modules include a MÂP1 module 400, a MÂP2 module 402, a difference module 404, a ΔIAT module 406, a comparator module 410 a NOT module 411, an IAT fault module 412 and an IAT pass module 414. The MÂP1 module 400 and the MÂP2 module 402 determine MÂP1 and MÂP2, respectively, based on the engine operating parameters, as described in detail above. The difference module 404 determines ΔMÂP based on MÂP1 and MÂP2.

The ΔIAT module 406 determines ΔIAT based on filtered ΔMÂP. In one embodiment, the ΔIAT module 406 can process ΔMÂP using a derived formula to calculate ΔIAT. In an alternative embodiment, the ΔIAT module 406 includes a pre-programmed look-up table and determines ΔIAT from the look-up table using ΔMÂP as an input.

The comparator module 410 compares ΔIAT to $\Delta IAT_{THR}$ and generates a signal based thereon, which is output to the IAT fault module 412. For example, if ΔIAT is greater than $\Delta IAT_{THR}$, the comparator module 410 generates a signal equal to "1", for example, and the IAT fault module 412 indicates an IAT fault. If ΔIAT is not greater than $\Delta IAT_{THR}$, the comparator module 410 generates a signal equal to "0", for example, and the IAT fault module 412 does not indicate an IAT fault. The NOT module 411 inverts the signal that is output from the comparator module 410. The IAT pass module 414 indicates an IAT pass based on the output of the NOT module 411.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of determining whether a fault condition of an intake air temperature (IAT) sensor of an engine is present, comprising:
    estimating a first manifold absolute pressure (MAP) based on a previously estimated first MAP and an estimated mass air flow (MAF), wherein said estimated MAF is based on a previously estimated MAF and a measured IAT;
    estimating a second MAP based on a previously estimated second MAP and a measured MAF;
    determining an IAT difference based on said first MAP and said second MAP; and
    determining whether said fault condition of said IAT sensor is present based on said IAT difference.

2. The method of claim 1 further comprising calculating a MAP difference based on said first MAP and said second MAP, wherein said IAT difference is determined based on said MAP difference.

3. The method of claim 1 wherein said determining whether said fault condition is present comprises:
    comparing said IAT difference to a threshold IAT difference; and
    indicating an IAT fault when said IAT difference is greater than said threshold IAT difference.

4. The method of claim 1 further comprising estimating said MAF based on a throttle inlet pressure and an effective flow area through the throttle.

5. The method of claim 1 wherein said first MAP is estimated based on an estimated first engine flow rate (EFR) from an intake manifold of said engine.

6. The method of claim 1 wherein said second MAP is estimated based on an estimated second engine flow rate (EFR) from an intake manifold of said engine.

7. The method of claim 1 wherein said first and second MAPs are estimated based on respective first and second exhaust gas recirculation (EGR) values.

8. A system for determining whether a fault condition of an intake air temperature (IAT) sensor of an engine is present, comprising:
    a first module that estimates a first manifold absolute pressure (MAP) based on a previously estimated first MAP and an estimated mass air flow (MAF), wherein said estimated MAF is based on a previously estimated MAF and a measured IAT;
    a second module that estimates a second MAP based on a previously estimated second MAP and a measured MAF;
    a third module that determines an IAT difference based on said first MAP and said second MAP; and
    a fourth module that determines whether said fault condition of said IAT sensor is present based on said IAT difference.

9. The system of claim 8 further comprising a fifth module that calculates a MAP difference based on said first MAP and said second MAP, wherein said IAT difference is determined based on said MAP difference.

10. The system of claim 8 wherein said fourth module determines whether said fault condition is present by:
    comparing said IAT difference to a threshold IAT difference; and
    indicating an IAT fault when said IAT difference is greater than said threshold IAT difference.

11. The system of claim 8 further comprising a fifth module that estimates said MAF based on a throttle inlet pressure and an effective flow area through the throttle.

12. The system of claim 8 wherein said first MAP is estimated based on an estimated first engine flow rate (EFR) from an intake manifold of said engine.

13. The system of claim 8 wherein said second MAP is estimated based on an estimated second engine flow rate (EFR) from an intake manifold of said engine.

14. The system of claim 8 wherein said first and second MAPs are estimated based on respective first and second exhaust gas recirculation (EGR) values.

15. A method of operating an engine using an intake air temperature (IAT) sensor, comprising:
    estimating a first manifold absolute pressure (MAP) based on a previously estimated first MAP and an estimated mass air flow (MAF), wherein said estimated MAF is based on a previously estimated MAF and a measured IAT;
    estimating a second MAP based on a previously estimated second MAP and a measured MAF;
    determining an IAT difference based on said first MAP and said second MAP;
    determining a corrected IAT value based on said IAT difference; and
    operating said engine based on said corrected IAT value.

16. The method of claim 15 further comprising calculating a MAP difference based on said first MAP and said second MAP, wherein said IAT difference is determined based on said MAP difference.

17. The method of claim 15 further comprising:
comparing said IAT difference to a threshold IAT difference; and
indicating an IAT fault when said IAT difference is greater than said threshold IAT difference.

18. The method of claim 15 further comprising estimating said MAF based on a throttle inlet pressure and an effective flow area through the throttle.

19. The method of claim 15 wherein said first MAP is estimated based on an estimated first engine flow rate (EFR) from an intake manifold of said engine.

20. The method of claim 15 wherein said second MAP is estimated based on an estimated second engine flow rate (EFR) from an intake manifold of said engine.

21. The method of claim 15 wherein said first and second MAPs are estimated based on respective first and second exhaust gas recirculation (EGR) values.

* * * * *